Jan. 25, 1938. C. W. BRENN 2,106,165
MANIFOLDING
Filed Aug. 22, 1936
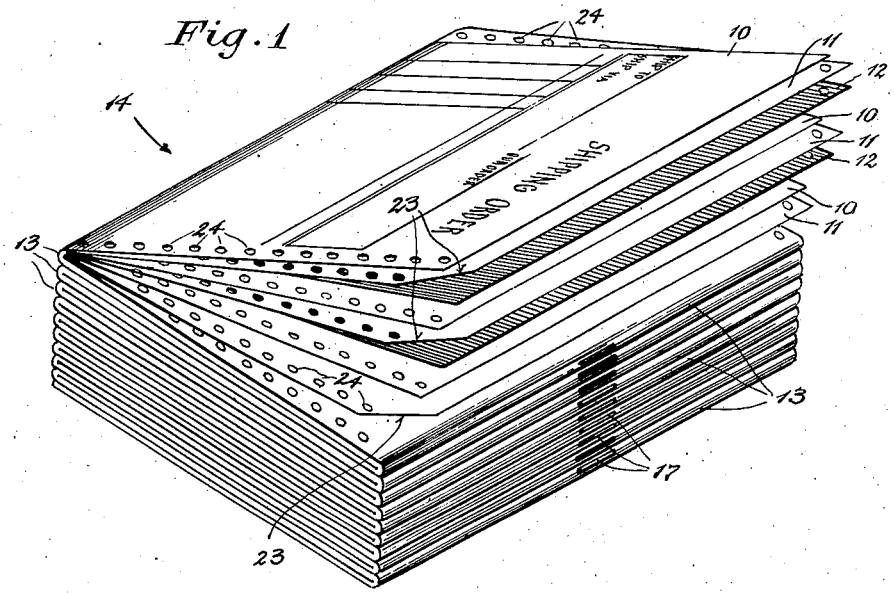
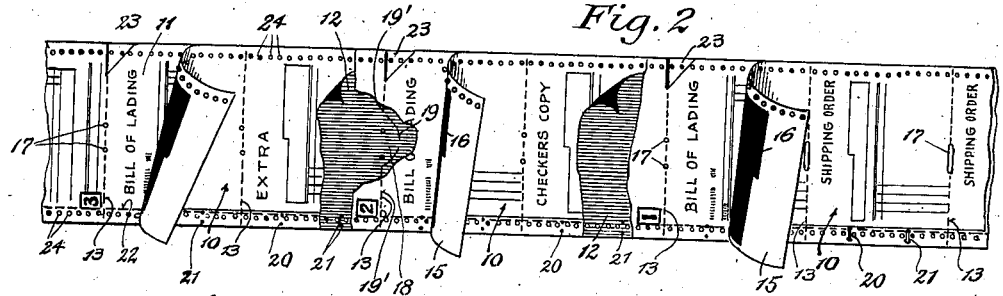
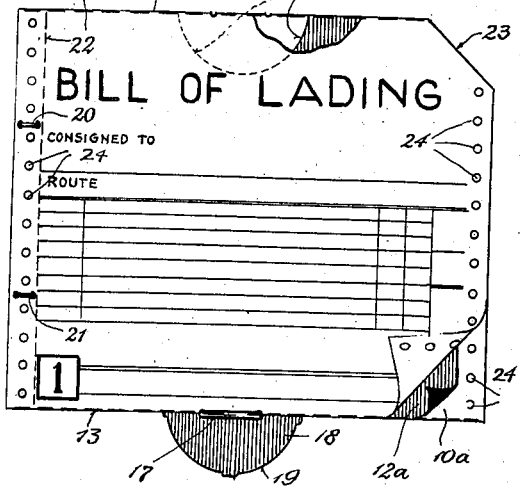
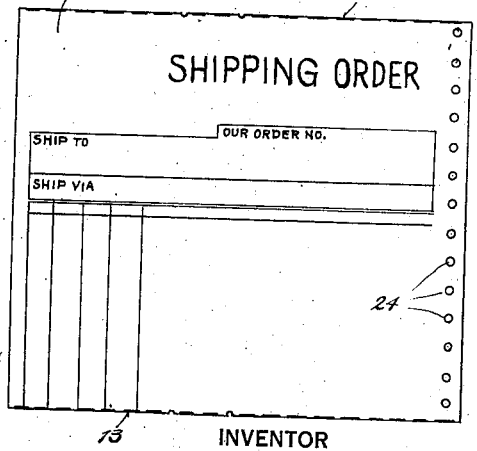
INVENTOR
*Carl W. Brenn,*
BY
ATTORNEY Patented Jan. 25, 1938

2,106,165

UNITED STATES PATENT OFFICE 2,106,165

MANIFOLDING

Carl W. Brenn, Montclair, N. J., assignor to Autographic Register Company, Hoboken, N. J., a corporation of New Jersey Application August 22, 1936, Serial No. 97,307

17 Claims. (Cl. 282—12)

This invention relates to manifolding, and, more particularly, to a manifolding pile or pack containing two groups of record strips with provisions for reproducing certain writings on all of the strips and other writings on only some of the strips. The manifolding pack of the present invention is particularly adapted for use with telegraphic typewriters.

Heretofore, with the use of telegraphic typewriters, it was the custom to receive an order for goods, at the factory for instance, from a branch house, itemizing the goods desired to be shipped and giving the name of the shipper, the route, etc. Multiple copies were made of these orders, so that one could be given to the stock clerk, one to the shipping clerk, and the rest to others. Such an order will hereinafter, in aid of a ready understanding of the invention, be called a shipping order. It was found impractical, however, to write the bill of lading, on which the goods were to be shipped, at the same time the shipping order was written, for various reasons. For instance, much of the information desired on the bill of lading is not available at the time of writing the order. Also, some of the goods frequently cannot be shipped at the same time as other goods on the order from the customer, and there is no necessity of itemizing the goods in the shipment on the bill of lading.

There are, nevertheless, some entries required on the bill of lading which are available at the time the shipping order is made out, such as the name of the customer, his address, and the method of shipment.

The object of the present invention is not only to make provision for writing the available information, on the bill of lading and on one or more copies thereof simultaneously with the writing of the shipping order and one or more copies thereof, and also to make provision for permitting the shipping orders to be removed from the bills of lading after the shipping order has been written, thereby to leave the bills of lading secured together in superposed position with carbon or transfer paper interleaved so that these bills of lading can be quickly and easily filled out when the necessary information is available and the goods are ready for shipment, but also to provide novel and valuable means whereby the aforesaid ends can be practically accomplished, and this without the need of mutilating both shipping orders and bills of lading or mutilating either of these forms intermediate the corners thereof.

In carrying out the present invention, continuous strips containing the bills of lading are alternated with continuous transfer strips, and at the same time continuous strips containing the shipping orders are so disposed that the topmost one of these shipping order strips is above the topmost bill of lading strip and the other shipping order strips are distributed in such manner that each of these last strips is above a shipping order strip and below a bill of lading strip.

Each shipping order strip has on the back of the strip transfer material located to overlie those portions of the underlying bill of lading which are to contain indicia common to factory orders and bills of lading; whereby the shipping orders perform the double function of blocking out, i. e., preventing writing on, the bills of lading, of the indicia which are not to be transferred to the latter, and of transferring to the bills of lading the notations which are common to bills of lading and shipping orders.

Also, in carrying out the invention, when the various strips are arranged as above outlined, they are secured together in registration so as to travel as one, and when, as in the preferred form of the invention, the strips are divided transversely by weakened severance lines into sheet-lengths, each sheet-length contains securing means.

According to the present invention, a plurality of such securing means are contained by each sheet-length.

One of said securing means is located in or along each of the weakened severance lines, but in such a way that, although one group of sheets lengths can be separated from the next group by tearing along the severance line separating the two groups, said securing means is applied to certain of the strips, desirably the transfer sheets, at portions thereof removed from the severance lines across the sheets last mentioned.

In order to facilitate the separation and removal of the shipping orders, after they have been written, from the bills of lading and their individually underlying transfer sheets, all the sheet elements of the group except the shipping orders are bound together by a second securing means so that by oppositely pulling on different portions of a group of sheet lengths, the shipping orders can be readily separated or snapped out from between the bills of lading and transfer sheets, and this in a way to avoid noticeable mutilation of either the bills of ladings or shipping orders while leaving the bills of lading and the transfer sheets connected together in one group all elements of which are secured together in proper relation to assist in passing the group last mentioned through an ordinary typewriter to permit additional notations to be made on all the bills of lading simultaneously.

At the same time, the side margins of the strips are desirably provided with rows of apertures to engage pin-like feeding devices carried by the typewriting machine, so that the strips may be fed positively, as in a telegraphic typewriter.

Other features and advantages will hereinafter appear.

The invention will be clearly understood by reference to the accompanying drawing, showing an embodiment as now preferred, and in which—

Figure 1 is a perspective view of the manifolding pile of the present invention.

Fig. 2 is a plan view of a part of the length of the pile laid flat, and with the strips torn away successively and folded back to show the relation in the pile of the various strips.

Fig. 3 is a plan view of a suitable shipping order, reproductions of which are carried by each of some of the record strips in the pile.

Fig. 4 is a plan view of a group of alternated and connected bill of lading sheets and transfer sheets, as these sheets become established as such group following snap-out of the shipping order sheets, and with the corners of some of the sheets folded back to show the position of one of the transfer sheets between two of the bill of lading sheets.

As shown in the accompanying drawing, the manifolding pile of the present invention comprises a plurality of continuous strips 10 containing suitable printing and constituting, in the form shown, shipping order blanks, and a plurality of continuous record strips 11 containing suitable printing and constituting, in the form shown, a succession of bills of lading. In addition to the strips 10 and 11, the pile contains continuous transfer strips 12.

The strips 10, 11 and 12 are superposed in a manner which will be explained below, and are provided with transverse lines of weakness 13 along which the strips may be torn to produce sheets 10a, hereinafter referred to as shipping orders, and sheets 11a, hereinafter referred to as bills of lading.

Preferably, the pile of strips 10, 11 and 12 is zigzig folded along the lines of perforations 13 to form a pack 14 shown in Fig. 1.

In superposing the strips 10, 11 and 12, the carbon or transfer strips 12 are placed under the bill of lading strips 11. Instead of placing each transfer strip directly over the next lower bill of lading strip 11, however, the latter and the carbon strip 12 are separated by the shipping order strips 10, and, so long as these strips 10 are interposed between the carbon strips and the bill of lading strips, the carbon strips are prevented from transferring impressions to the bills of lading. The uppermost bill of lading strip 11 is likewise covered by the uppermost shipping order strip 10, so that the ink impressions from the typewriter ribbon will not be produced on the bill of lading.

It will be seen, therefore, that, so long as the shipping orders are in place in the pile, the function of the carbon strip 12 is to transfer the impressions to the underlying shipping orders, and the latter prevent the carbon strip 12 from transferring impressions on the bills of lading.

Accordingly, such items as the kind, quantity, and quality of the merchandise being ordered will not appear on the bill of lading strips but only on the shipping order strips.

There are, however, certain entries which are required both on the shipping order and on the bill of lading, such as the name of the consignee and his address and the shipping instructions. To permit the transfer of these indicia to the bill of lading, each of the shipping order strips has on its back face 15 a coating 16 of transfer material covering the area of the bill of lading containing the indicia which it is to receive during the writing of the shipping order. This coated area 16 lies directly under the places on the shipping order which are to receive the common indicia.

To maintain the strips in registration and so that they will feed as one, the strips are held together at definite intervals by staples 17. There is at least one such staple for each superposed set of sheets so that when a group of sheets is severed from the pile, this group containing shipping orders, bills of lading, and transfer sheets, it will be held together as long as desired.

A staple 17 is here located in each set of matching severance lines across the bill of lading strips 11 and shipping order strips 10, and aligned with but removed from the severance lines across the transfer strips 12. That is to say, each staple 17 is located in a stub portion 18 of each transfer strip; such stub portion being here shown as defined by a substantially semi-circular severance line 19. These stub portions are incorporated only in the transfer sheets, and on each transfer sheet said line 19 is between and links together two straight severance lines 19'. These lines 19' coincide in location with the lines of weakness 13 of Fig. 2 along which lines 13 the bill of lading strips and the shipping order strips 11 are weakened.

A complete group of collated sheets can be separated from the pile of Fig. 1 by tearing along the weakened lines 13 separating the strip portions of that group from those of the following group. The staples 17 are not lost, and they retain their intended functions in coating with staples 20 and 21 in holding the transfer sheets 12a in matching arrangement, since, in thus tearing along said lines 13, although the shipping order sheets and bill of lading sheets part from their strips along straight lines of severance, the transfer sheets 12a part from their strips along a line of severance 19' which is straight only near the side margins of the pile, and which lines of severance are linked together by the semi-circular lines 19 carried by the transfer sheets. The staples 17 pass through the transfer strips at points removed from any severance lines carried there.

After the shipping orders 10a of a group of sheets have been written, these shipping orders can be removed from the group, as indicated in Fig. 3, leaving the bills of lading 11a and the transfer sheets 12a secured together as a unit, as in Fig. 4, to receive manifold typewriting operations when the order has been filled and the goods are ready for shipment.

In order to permit separation of the shipping order sheets from the bill of lading sheets and the transfer sheets of a group of all these sheets, the staples are on the lines of weakness 13, and rendered inoperative relative to any group severed from the pile. To allow easy later snap-out of the bill of lading sheets from the transfer sheets, means are provided here including staples 20 and 21, lines of weakness 22 in certain of the sheets, and corner notches 23 in certain of the sheets.

These lines of weakness 22, which run longitudinally of the pile, are only in the bill of lading strips 11 in the embodiment of the invention illustrated. The shipping order strips 10 are narrower than the strips 11, and the strips 10 are arranged in the pile so that their longitudinal edges, at that side of the pile adjacent to which the lines of weakness 22 run along the bill of lading strips 11, are substantially in line with said lines of weakness 22. Therefore, the staples 20 and 21 do not engage the shipping order strips 10, and so the shipping order sheets are not attached to the other sheets of a set following tear-off of the set from the pile.

The transfer strips 12 are also narrower than the bill of lading strips 11, and the longitudinal edges of the strips 12, at the side of the pile remote from the staples 20 and 21, are set back from that side of the pile. This provides projecting areas on the bill of lading sheets by which the latter may be grasped independently of the carbon sheets when it is desired to separate the carbon sheets and the bill of lading sheets.

The staples 20 and 21 connect together each superposed set or group of bills of lading and transfer sheets. These staples, like the staples 17, are individually extended across the pile widthwisely thereof, but the staples 20 and 21 are all located in a column running along one side margin of the pile.

The lines of weakness 22, which run longitudinally of the bill of lading strips, are located just beyond the column of staples 20 and 21.

The notches 23 are cut only in the bill of lading strips. These notches are placed in the side margin of these strips opposite to that through which the staples 20 and 21 are sent, and one such notch is located at the upper end of each bill of lading. In the present case, then, these notches 23 are located at the upper right-hand corner of each bill of lading sheet.

After a complete group of collated sheets has been given the indicia to be common to the bill of lading and shipping orders, and conveniently after all these sheets have subsequently been separated from the pile of Fig. 1, as by tearing along the weakened lines 13 separating that group from the follower group, the shipping orders can all be pulled out of the group simultaneously. To do this, it is merely necessary to grasp the group with say the left hand along the left-hand side margin of the group where the staples 20 and 21 are carried, grasp the group with the right hand along the right side margin of the group and over the notches 23 in the bill of lading sheets but beyond the transfer sheets, and oppositely pull on these marginal portions. By this operation, the shipping orders are all simultaneously pulled out, leaving now merely alternately arranged bill of lading sheets and transfer sheets in a collated and dependably locked set.

After the special entries for the bill of lading sheets have been made thereon, all the bill of lading sheets can be simultaneously snapped out from the sheet parts held together by the staples 20 and 21, by severing the bill of lading sheets along their lines of weakness 22. To do this, it is merely necessary to grasp the set with one hand along the left-hand side margin where the staples 20 and 21 are carried, grasp the set with the other hand along the right side margin beyond the transfer strips 12, and oppositely pull on these marginal portions.

In order to permit the feeding of the pile of strips to be controlled positively, one or more of the strips may be provided with rows of pin-engaging apertures 24 in one or more lateral margins of the strip. As shown, the bill of lading strips 11 have such pinwheel-engaging apertures at both sides of the pile, while the transfer strips 12 have the apertures 24 only at one side of the pile, and the shipping order strips 10 have said apertures only at the other side of the pile.

It should be understood that the invention is not limited to the particular embodiment illustrated in the accompanying drawing nor to the purpose or use of the respective strips, and that the terms "shipping order" and "bill of lading" have been used in reference to the specific embodiment of the invention which is illustrated for convenience, it being an embodiment which has been found particularly practical and useful.

Variations and modifications may be made within the scope of this invention and portions of the improvements may be used without others.

I claim:

1. A manifolding pile comprising a plurality of continuous record strips in superposed relation; a plurality of continuous transfer strips interleaved with said record strips; other continuous record strips each overlying one of said first-named record strips to receive type impressions direct and transferred from said transfer strips and simultaneously block out the transfer of type impressions on certain parts of the first-named record strips, said second-named record strips having on their back surfaces transfer material covering areas in which type impressions are to be made simultaneously on all of the strips; means for securing all of said strips together to travel as one, all of said strips being divided into uniform sheet-lengths by transverse lines of weakness along which the pile may be severed to form sets of superposed sheets, and said securing means being located on said transverse lines of weakness; and means for securing said transfer strips and said first-named record strips together to permit the easy removal of the sheets of the second-named record strips leaving the sheets of the first-named record strips secured together and interleaved with transfer sheets for subsequent manifold writing operations.

2. A manifolding pile comprising a plurality of continuous record strips in superposed relation; a plurality of continuous transfer strips interleaved with said record strips; other continuous record strips each overlying one of said first-named record strips to receive type impressions direct and transferred from said transfer strips and simultaneously block out the transfer of type impressions on certain parts of the first-named record strips; transfer material between the second-named record strips and the first-named record strips covering areas in which type impressions are to be made simultaneously on all of the strips; means for securing all of said strips together to travel as one, all of said strips being divided into uniform sheet-lengths by transverse lines of weakness along which the pile may be severed to form sets of superposed sheets, and said securing means being located on said transverse lines of weakness; and means for securing said transfer strips and said first-named record strips together to permit the easy removal of the sheets of the second-named record strips leaving the sheets of the first-named record strips secured together and interleaved with transfer sheets for subsequent manifold writing operations, the second-named securing means being located in a marginal portion of the pile, said marginal portion of the pile being marked off by lines of weakness running longitudinally of the first-named record strips.

3. A manifolding pile as in claim 2, wherein the sheets of the second-named record strips have side edge portions remote from the last-named lines of weakness and which project beyond adjacent edge portions of the sheets of the first-named record strips.

4. A manifolding pile as in claim 2, wherein the sheets of the first-named record strips have cut-outs at their side edges remote from the last-named lines of weakness, to allow all the sheets of the second-named record strips in a group to be simultaneously grasped without grasping any of the sheets of the first-named record strips in that group.

5. A manifolding pile as in claim 2, wherein the sheets of the second-named record strips have side edge portions remote from the last-named lines of weakness and which project beyond adjacent edge portions of the sheets of the first-named record strips, and wherein the strips are provided with marginal rows of pin-engaging apertures.

6. A manifolding pile as in claim 2, wherein the sheets of the second-named record strips have side edge portions remote from the last-named lines of weakness and which project beyond adjacent edge portions of the sheets of the first-named record strips, and wherein the first-named record strips are provided at their sides adjacent to the last-named lines of weakness with marginal rows of pin-engaging apertures.

7. A manifolding pile as in claim 2, wherein the sheets of the second-named record strips have side edge portions remote from the last-named lines of weakness and which project beyond adjacent edge portions of the sheets of the first-named record strips, and wherein the first-named record strips are provided at their sides adjacent to the last-named lines of weakness with marginal rows of pin-engaging apertures, the second-named securing means being located in line with and between said apertures.

8. A manifolding pile as in claim 2, wherein the sheets of the second-named record strips have side edge portions remote from the last-named lines of weakness and which project beyond adjacent edge portions of the sheets of the first-named record strips, and wherein the first-named record strips and the transfer strips are provided with marginal rows of pin-engaging apertures, the second-named securing means being staples applied transversely of said first-named strips and said transfer strips between pairs of successive apertures.

9. A manifolding pile comprising a plurality of continuous record strips in superposed relation; a plurality of continuous transfer strips interleaved with said record strips; other continuous record strips each overlying one of said first-named record strips to receive type impressions direct and transferred from said transfer strips and simultaneously block out the transfer of type impressions on certain parts of the first-named record strips; transfer material between the second-named record strips and the first-named record strips covering areas in which type impressions are to be made simultaneously on all of the strips; means for securing all of said strips together to travel as one, all of said strips being divided into uniform sheet-lengths by transverse lines of weakness along which the pile may be severed to form sets of superposed sheets, and said securing means being located on said transverse lines of weakness; and means for securing said transfer strips and said first-named record strips together to permit the easy removal of the sheets of the second-named record strips leaving the sheets of the first-named record strips secured together and interleaved with transfer sheets for subsequent manifold writing operations.

10. A manifolding pile as in claim 9, wherein the second-named securing means are located in a marginal portion of the pile.

11. A manifolding pile as in claim 9, wherein the first-named securing means is carried along said transverse lines of weakness in the record strips, and in a line remote from said transverse lines of weakness in the transfer strips.

12. A manifolding pile as in claim 9, wherein the first-named securing means is carried along said transverse lines of weakness in the record strips, and in a line remote from said transverse lines of weakness in the transfer strips, the last-mentioned lines of weakness including straight-line terminal portions aligned with the transverse lines of weakness of the record strips, these terminal portions linked by lines of weakness directed to skirt said first-named securing means.

13. A manifolding pile as in claim 9, wherein the first-named securing means is carried along said transverse lines of weakness in the record strips, and in a line remote from said transverse lines of weakness in the transfer strips, the last-mentioned lines of weakness including straight-line terminal portions aligned with the transverse lines of weakness of the record strips, these terminal portions linked by lines of weakness directed to skirt said first-named securing means, said first-named securing means being wire staples.

14. A manifolding pile as in cleam 9, wherein the second-named securing means are located in a marginal portion of the pile and being applied to said marginal portion within the limits of each sheet-length of the pile.

15. A manifolding pile as in claim 9, wherein the second-named securing means are located in a marginal portion of the pile, and wherein the second-named record strips have side edge portions which are located a sufficient distance inwardly of the width of the pile, at the side of the pile having the marginal portion aforesaid, to prevent engagement of the second-named securing means with said second-named record strips.

16. A manifolding pile as in claim 9, wherein the second-named securing means are located in a marginal portion of the pile, and wherein the second-named record strips have side edge portions which are located a sufficient distance inwardly of the width of the pile, at the side of the pile having the marginal portion aforesaid, to prevent engagement of the second-named securing means with said second-named record strips, said second-named record strips being provided, at their side edges remote from the marginal portion of the pile, with marginal rows of pin-engaging apertures.

17. A manifolding pile comprising a plurality of continuous record strips in superposed relation; a plurality of continuous transfer strips interleaved with said record strips; other continuous record strips each overlying one of said first-named record strips to receive type impressions direct and transferred from said transfer strips and simultaneously block out the transfer of type impressions on certain parts of the first-named record strips; transfer material between the second-named record strips and the first-named record strips covering areas in which type impressions are to be made simultaneously on all of the strips; means for securing all of said strips together to travel as one, all of said strips being divided into uniform sheet-lengths by transverse lines of weakness along which the pile may be severed to form sets of superposed sheets, and said securing means being located on said transverse lines of weakness; and means for securing said transfer strips and said first-named record strips together to permit the easy removal of the sheets of the second-named record strips leaving the sheets of the first-named record strips secured together and interleaved with transfer sheets for subsequent manifold writing operations, the second-named securing means being located in a marginal portion of the pile, said marginal portion of the pile being marked off by lines of weakness running longitudinally of the first-named record strips, the second-named record strips being narrower than the first-named record strips and placed in the pile with side edges adjacent to said longitudinal lines of weakness, and the transfer strips being narrower than the first-named record strips and placed in the pile with side edges adjacent to those side edges of the first-named record strips which are remote from said longitudinal lines of weakness.

CARL W. BRENN.